UNITED STATES PATENT OFFICE.

THOMAS MATHIESON THOM, OF CHESHUNT, ENGLAND, ASSIGNOR TO THE LITHOGRAPHIC STONE AND MARBLE COMPANY LIMITED, OF LONDON, ENGLAND.

ARTIFICIAL STONE.

963,337.

No Drawing.

Specification of Letters Patent. Patented July 5, 1910.

Application filed July 13, 1906. Serial No. 326,039.

*To all whom it may concern:*

Be it known that I, THOMAS MATHIESON THOM, a subject of the King of Great Britain, and resident of Cheshunt, in the county of Hertford, England, have invented new and useful Improvements in Artificial Stone, of which the following is a specification.

The present invention has reference to the reconstruction by artificial means of aqueous rocks, organically derived. The principal of these, the calcareous, is dealt with only. The best known of these are the limestones, classed as compact, magnesian, or oolitic. The best of the compact limestones is found in the south of England and is called Chilmark. Salisbury Cathedral, Wilton Abbey, etc., are built from this stone. The Tottenhoe stone is found in the midlands and was used in the building of Dunstable Priory, Luton Church, etc. These compact stones are also found in Derbyshire and used in building Chatsworth, Belvoir, etc. Ancaster, a stone found in Lincolnshire, is also used. Of magnesian limestones Anston and Bolsover Moor stones were used in the construction of the Houses of Parliament; the Tadcaster, at York, Beverley and Ripon Minsters and other buildings; the Roche Abbey stone used in the building of that name and in other churches in Yorkshire and Lincolnshire. The Brodsworth found near Doncaster and the Huddlestone near Sherburne are also extensively used. The Kentish rag found near Maidstone is a hard compact limestone. By far the most important, however, of these calcareous stones is the oolite, egg-stone or roe-stone, so called from its resemblance when broken, to a conglomeration of globular eggs, or its likeness to the hard roe of a fish. Good examples of oolitic stones are the Barnack from Northamptonshire, of which Peterborough Cathedral, etc., are built and Ketton stone, used at most of the colleges in Cambridge, Bury St. Edmunds, Bedford, Stamford, Doulting in Somersetshire and at Wells Cathedral and surrounding churches. The principal English oolites used in masonry are the Bath and the Portland. Large quantities are also imported from Caen in Normandy.

The object of my present invention is, from the waste debris of any limestone, whether compact, magnesian or oolitic and found in any part of the world, to re-construct building stone in such a manner that the finished product is not to be distinguished from the best natural stone, while it is the superior in density and hardness.

In the quarries from which Portland and Bath stones are taken there is always much waste in the shape of chips and small fragments made in the quarrying of the larger and marketable pieces. As these stones are composed of grains bound by lime, I merely, by crushing and screening, bring back the grains to their original condition. In the case of the compact or homogeneous limestones the raw material is ground to the degree of fineness exhibited in the natural stone. And so with the dolomitic or magnesian limestones used in masonry. To reproduce any of the foregoing, nothing more is needful than to examine closely the grain or texture of the stone and to retain the same for use when reproducing. To the stone thus reduced is added a proportion of lime, say about one seventh and if it is desired to bring the oxid of lime to the tone of the carbonate a sufficiency of iron oxid or other suitable coloring matter is added to the mixture. The whole is then thoroughly mixed in a dry state in a rotating drum or its equivalent and the mixture slaked. After slaking, the mixture is pressed in molds under a pressure of $\frac{1}{4}$ to $\frac{1}{2}$ ton to the square inch, according to the density desired. The slabs or blocks thus produced are placed in a hot chamber to remove the remaining moisture and finally they are submitted to a carbonating process in a closed vessel whence the atmospheric air has been exhausted before the carbonic acid gas is admitted thereto.

I may remark here, though according to my previous British Patent No. 13467 of 1900 I carbonate the blocks in a closed vessel by a gradually increasing pressure, commencing at about 30 lbs. to the square inch, and finishing at about 350 lbs. to the square inch, yet the operation in this case, though following on the same lines is of a considerably simpler and speedier nature. The pressure exerted upon the plastic material is, comparatively, so slight that the drying of the molded block is accomplished in about 2 days, whereas in the manufacture of artificial lithographic stone or marble according to the patent above mentioned, when 2 tons pressure and upward is used, the time required for drying is from three to four weeks. The rapid expulsion of the water is safely accomplished in a block molded under the slight pressure named herein, whereas under my previous patent considerable care is required to exhaust the moisture by gradual evaporation as, if heat were applied too suddenly the block would split and be rendered useless. The rapid drying of the building block also facilitates quick induration and the work of carbonation is effected at a very much less pressure, in no case exceeding 150 lbs. per square inch.

By my previous patent a block of marble or lithographic stone of a size, say, 32"×44"×3" would require from 3 to 4 weeks drying, and its induration in the carbonating tank could not be effected under a less space of time, and under a less pressure than 350 lbs. to the square inch. A similar block of building material could be dried in 2 days and perfect carbonation effected in a like length of time and with a maximum pressure of 150 lbs. to the square inch.

In this way I am able to produce entirely new articles of commerce, viz: building stones artificially manufactured, having the exact characteristics of the natural articles, whether they be of compact magnesian, or oolitic origin, or in whatever part of the world they may be found.

What I claim as my invention and desire to secure by Letters Patent is:—

1. The manufacture of artificial granular calcareous stone which consists in producing reconstructed stone in exact accordance with the natural building stone by crushing the fragments of the natural stone and screening the crushed mass to obtain the natural granules of the particular stone to be reconstructed, mixing the said granules with lime, slaking the mixture, molding the same under a pressure of from one-fourth to one-half ton per square inch, removing moisture from the molded blocks and finally indurating the blocks with carbonic acid gas.

2. The manufacture of artificial granular calcareous stone which consists in producing reconstructed stone in exact accordance with the natural building stone by crushing the fragments of the natural stone, screening the crushed mass to obtain the natural granules of the particular stone to be reconstructed, mixing the said granules with lime, slaking the mixture, molding the same, removing moisture from the molded blocks and finally indurating the blocks with carbonic acid gas in a closed vessel from which the atmospheric air has been exhausted.

3. The manufacture of artificial granular calcareous stone which consists in producing reconstructed stone in exact accordance with the natural building stone by crushing the fragments of the natural stone and screening the crushed mass to obtain the natural granules of the particular stone to be reconstructed, mixing the said granules with lime, adding a coloring medium, slaking the mixture, molding the same under a pressure of from one-fourth to one-half ton per square inch, removing moisture from the molded blocks and finally indurating the blocks with carbonic acid gas in a closed vessel from which atmospheric air has been exhausted.

In testimony, that I claim the foregoing as my invention, I have signed my name in presence of two witnesses, this twenty-first day of June, 1906.

THOMAS MATHIESON THOM.

Witnesses:
  LOVELL NEWTON REDDIE,
  ALFRED P. BISHOP.